United States Patent [19]
Yanidis

[11] Patent Number: 4,880,696
[45] Date of Patent: Nov. 14, 1989

[54] FLEXIBLE PACKAGING MATERIAL CONTAINING AN ANTIOXIDANT
[75] Inventor: Apostol Yanidis, Berkeley, Calif.
[73] Assignee: James River II, Inc., Oakland, Calif.
[21] Appl. No.: 211,942
[22] Filed: Jun. 27, 1988
[51] Int. Cl.$^4$ ............................................... B32B 7/00
[52] U.S. Cl. .................... 428/349; 428/514; 428/537.5; 156/243; 156/244.11
[58] Field of Search ...................... 428/349, 34.2, 34.3, 428/35.7, 36.7, 537.5; 264/211, 211.24; 156/243, 244.11

[56] References Cited
U.S. PATENT DOCUMENTS

| | | | |
|---|---|---|---|
| 3,707,393 | 12/1972 | McDonald | 428/511 |
| 4,252,846 | 2/1981 | Romesburg et al. | 428/35.2 |
| 4,265,949 | 5/1981 | Kugimiya | 428/35.2 |

FOREIGN PATENT DOCUMENTS 1162730 2/1984 Canada .

Primary Examiner—George F. Lesmes
Assistant Examiner—D. Cornstubble
Attorney, Agent, or Firm—Stanley M. Teigland

[57] ABSTRACT

The concentration of BHT in a flexible packaging material, such as a cereal liner, can be increased by incorporating the BHT into a polymer composition that is extrusion coated onto a substrate, such as PVDC-coated paper. The extrusion coating comprises a heatseal layer and an EVA tie layer containing the BHT. This method substantially prevents evaporation of the BHT. The extrusion temperature is less than the boiling point of BHT.

13 Claims, No Drawings

FLEXIBLE PACKAGING MATERIAL CONTAINING AN ANTIOXIDANT

This invention is a flexible packaging material containing a butylated phenolic antioxidant. The invention also provides a method for making the packaging material.

As taught in Canadian Pat. No. 1,162,730, butylated phenolic antioxidants are added to food packaging materials, such as cereal liners, to preserve food packaged in the materials. The antioxidant is blended with a polymer which is extruded to form a layer of the packaging material. Prior to this invention, the amount of antioxidant that could effectively be added to the material in a cast extrusion process was limited because of the tendency of the antioxidant to evaporate from the polymer layer when it is extruded.

In this invention the amount of antioxidant added to the packaging material is greater than that previously thought to be feasible. The antioxidant is incorporated into a layer of a thermoplastic polymer composition that is extruded onto a flexible substrate. The extruded composition includes at least one other polymer layer which is more remote from the substrate than the layer containing the antioxidant, with the result that the layer containing the antioxidant becomes sandwiched between the substrate and the more remote layer. Since the layer containing the antioxidant becomes sandwiched soon after being extruded, evaporation of the antioxidant is substantially prevented. However, the antioxidant later migrates through the more remote layer to preserve food packaged in the material.

The composition is extruded onto the substrate at a temperature below the boiling point of the antioxidant, preferably at least 45° F. (25° C.) below the boiling point.

The substrate provides bulk to the packaging material, and preferably provides such other properties as stiffness and deadfold. The substrate also preferably has a layer providing a barrier to transmission of oxygen, moisture, and the antioxidant. The substrate is preferably paper coated with polyvinylidene chloride (PVDC).

In the composition that is extrusion coated onto the substrate, the more remote layer is preferably a heatseal layer. The heatseal layer is heatsealed to itself at the margins when the material is formed into a package, such as a cereal liner. The heatseal layer is preferably a blend of an ionomer (Surlyn) and polybutylene. The blend provides a good easy-open heatseal and may be extruded at a temperature as low as 400° F. The melt index of the heatseal layer is preferably between about 5 and 10.

The antioxidant is preferably incorporated into the layer that contacts the substrate. The polymer with which the antioxidant is blended is preferably one which provides good adhesion between the substrate and the extrusion coating. The polymer is preferably a copolymer of ethylene and vinyl acetate (EVA). The vinyl acetate (VA) content of the copolymer is preferably between 18 and 32 percent by weight. The EVA adheres well to PVDC and may be extruded at a temperature as low as 400° F. The melt index of the polymer with which the antioxidant is blended is preferably between about 5 and 10.

Butylated phenolic antioxidants include butylated hydroxyanisole (BHA) and butylated hydroxytoluene (BHT). BHA is a mixture of 2-tert-butyl-4-methoxyphenol and 3-tert-butyl-4-methoxyphenol. BHT is properly known as 2,6-di-tert-butyl-para-cresol. BHT, which has a boiling point of 509° F. (265° C.), is preferred. It is commercially available as a concentrate produced by blending about 5 percent BHT with a carrier resin, such as EVA. In preparing the materials of this invention, the concentrate is blended with the polymer forming the layer containing the BHT.

The concentration of the antioxidant is preferably between about 0.5 and 1.0 percent based on the weight of the layer containing the antioxidant, and between about 0.25 and 0.5 percent based on the weight of the polymer composition. This concentration is substantially greater than concentrations previously employed in the art, and is attributable to the method of this invention.

The following example illustrates the best mode contemplated for practicing the invention.

EXAMPLE

A flexible packaging material was prepared by extrusion coating a composition having two layers onto a substrate consisting of paper coated with PVDC. The extrusion temperature was 450° F. (232° C.).

The layer adjacent the PVDC layer consisted of 15 percent BHT concentrate and 85 percent EVA having a VA content of 29 percent. The BHT concentrate consisted of 5 percent BHT in EVA having a VA content of 12 percent.

The other layer was a heatseal layer consisting of a blend of 70 percent of an ionomer (Surlyn 1652 SB), 28 percent polybutylene, and 2 percent slip additive (Compol 8719-3).

The concentration of BHT was 0.75 percent in the EVA layer and 0.375 percent in the extrusion coating.

The basis weights (pounds per ream) of the paper, PVDC, EVA and heatseal layers were 30, 10, 5 and 5, respectively.

The packaging material was used as a cereal liner with excellent results.

I claim:

1. A method of making a flexible packaging material containing a butylated phenolic antioxidant, which method comprises extruding a thermoplastic polymer composition onto a flexible substrate, the extruded composition comprising a layer of polymer containing the antioxidant and a layer of polymer more remote from the substrate than the layer containing the antioxidant, the extrusion temperature of the composition being less than the boiling point of the antioxidant, whereby the layer containing the antioxidant becomes sandwiched between the substrate and the more remote layer.

2. The method of claim 1 wherein the extrusion temperature is at least 45° F. less than the boiling point of the antioxidant.

3. The method of claim 1 wherein the antioxidant is butylated hydroxytoluene.

4. The method of claim 3 wherein the amount of the antioxidant is between about 0.5 and 1.0 percent based on the weight of the layer containing the antioxidant and between about 0.25 and 0.5 percent based on the weight of the polymer composition.

5. The method of claim 4 wherein the more remote polymer layer is a heatseal layer and the layer containing the antioxidant contacts the substrate.

6. The method of claim 5 wherein the polymer containing the antioxidant is an ethylene-vinyl acetate copolymer having a vinyl acetate content between about 18 and 32 percent by weight.

7. The method of claim 6 wherein the substrate is paper coated with polyvinylidene chloride.

8. The packaging material made by the method of claim 1.

9. In a flexible packaging material comprising a substrate extrusion coated with a polymer composition comprising an outer heatseal layer and an inner polymer layer, the improvement wherein the inner polymer layer contains a butylated phenolic antioxidant.

10. The improvement of claim 9 wherein the antioxidant is butylated hydroxytoluene.

11. The improvement of claim 9 wherein the amount of the antioxidant is between about 0.5 and 1.0 percent based on the weight of the layer containing the antioxidant and between about 0.25 and 0.5 percent based on the weight of the polymer composition.

12. The improvement of the claim 11 wherein the inner layer contacts the substrate and comprises an ethylene-vinyl acetate copolymer having a vinyl acetate content between about 18 and 32 percent by weight.

13. The improvement of claim 12 wherein the substrate is paper coated with polyvinylidene chloride.

* * * * *